United States Patent [19]

Kanai et al.

[11] Patent Number: 4,475,967
[45] Date of Patent: Oct. 9, 1984

[54] METHOD OF MAKING A CERAMIC CAPACITOR

[75] Inventors: Kazuhiko Kanai, Nagaokakyo; Yukio Sakabe, Kyoto, both of Japan

[73] Assignee: Murata Manufacturing Co., Ltd., Japan

[21] Appl. No.: 520,336

[22] Filed: Aug. 4, 1983

Related U.S. Application Data

[62] Division of Ser. No. 328,927, Dec. 9, 1981, abandoned.

[30] Foreign Application Priority Data

Dec. 19, 1980 [JP] Japan .................................. 55-181019
Jan. 14, 1981 [JP] Japan ..................................... 56-4780

[51] Int. Cl.$^3$ ........................ B32B 31/04; H01G 4/32
[52] U.S. Cl. ..................................... 156/89; 361/309; 361/310; 361/321
[58] Field of Search .................. 156/89; 361/309, 310, 361/321

[56] References Cited

U.S. PATENT DOCUMENTS 3,515,958  6/1970  Claypoole ........................... 361/310
4,348,714  7/1982  Wallace ................................ 361/321

FOREIGN PATENT DOCUMENTS 351809  8/1937  Italy .................................... 361/321
 85016  6/1980  Japan .................................. 361/321
875885  1/1961  United Kingdom ................ 361/304

Primary Examiner—Caleb Weston
Attorney, Agent, or Firm—Ostrolenk, Faber, Gerb & Soffen

[57] ABSTRACT

A rolled type ceramic capacitor produced by the process comprising the steps of forming first and second inner electrodes alternately formed across insulating gaps on one surface of a single ceramic green sheet, rolling the ceramic green sheet with the inner electrodes formed thereon, whereby the first and second inner electrodes opposing to each other with the ceramic green sheet intervening therebetween, firing the rolled ceramic green sheet, and electrically connecting first and second outer electrode to the first and second inner electrodes, respectively. The ceramic capacitor can attain small size for large capacitance.

6 Claims, 23 Drawing Figures

PRIOR ART
FIG. 1
PRIOR ART
FIG. 2
PRIOR ART
FIG. 3
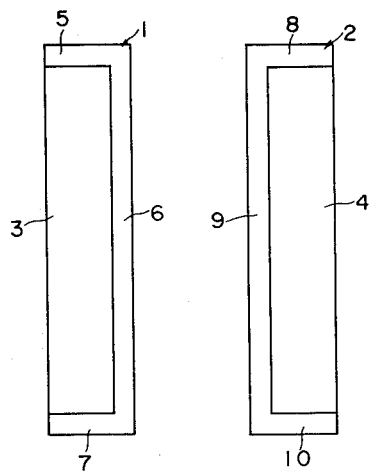
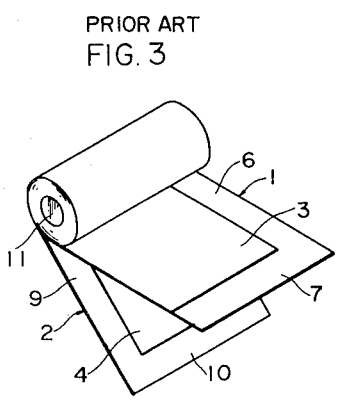
PRIOR ART
FIG. 4
FIG. 6
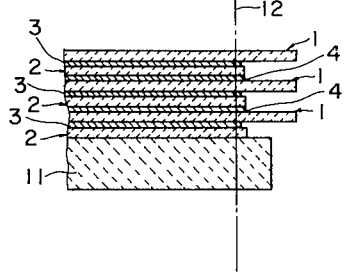
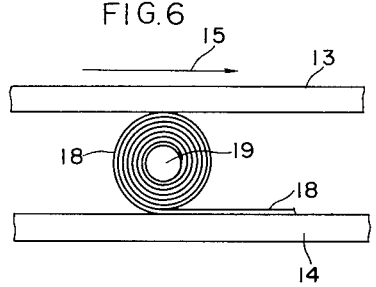
FIG. 7
FIG. 8
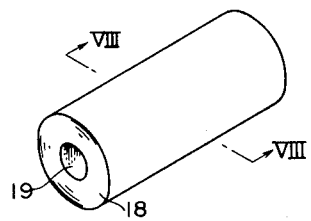
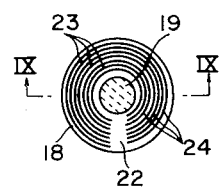

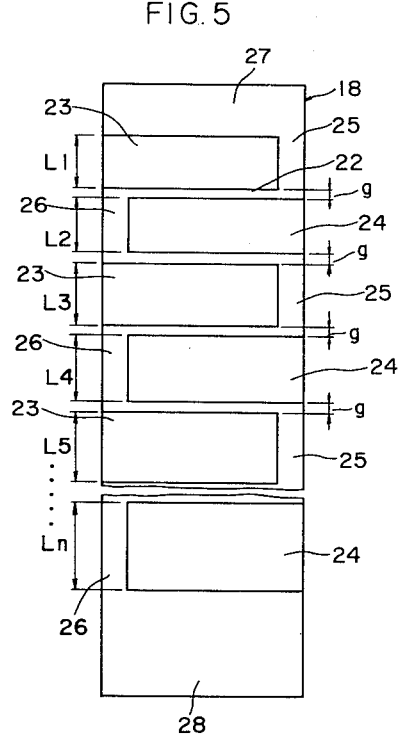
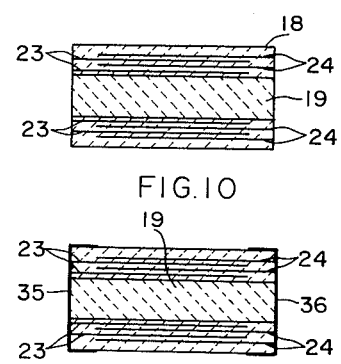
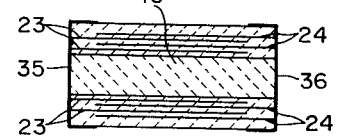
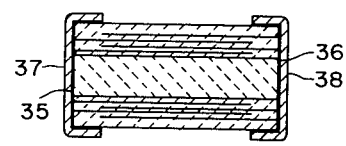
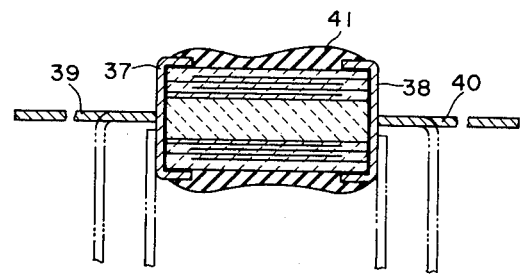

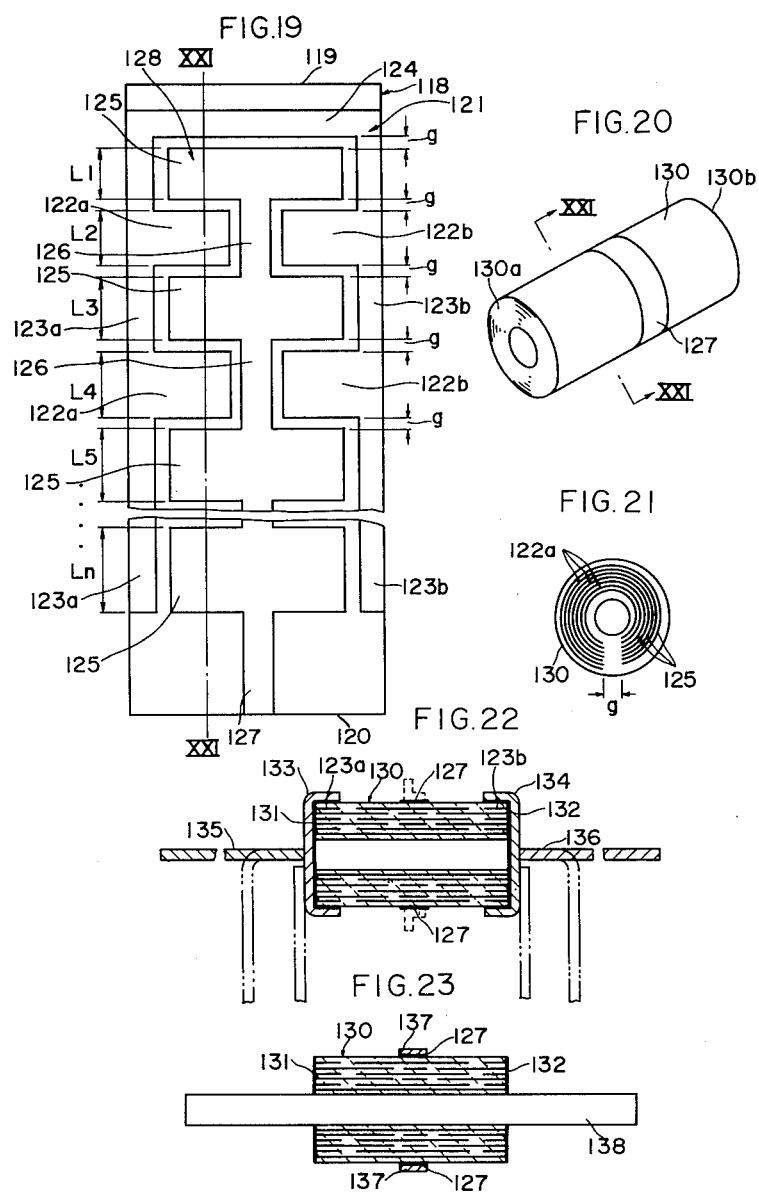

METHOD OF MAKING A CERAMIC CAPACITOR

RELATED APPLICATIONS

This is a divisional of U.S. patent application Ser. No. 328,927, filed Dec. 9, 1981, abandoned.

BACKGROUND OF THE INVENTION

Field of the Invention

This invention relates to a ceramic capacitor and a process therefor and more particularly to a ceramic capacitor called a "rolled" type and a process for its manufacture.

Description of the Prior Art

As a capacitor suitable for use in a small-sized electronic circuit and having large capacitance in spite of its small size, rolled type capacitors are disclosed in the U.S. Pat. No. 3,004,197, entitled "Ceramic Capacitor and Method of Making it" and issued Oct. 10, 1961 to A. R. Rodriguez, et al. Any of these conventional rolled type of ceramic capacitors comprise at least two ceramic green sheets to be used therein.

FIGS. 1 and 2 are plane views of ceramic green sheets used in making a conventional rolled type ceramic capacitor, respectively, showing the patterns of inner electrodes as formed thereon. FIG. 3 is a perspective view showing a state in the course of making a ceramic capacitor by rolling the ceramic green sheets shown in FIGS. 1 and 2.

Referring to FIGS. 1 and 2, inner electrodes 3, 4 are formed on each one of the surfaces of the two ceramic green sheets 1, 2, respectively. The first inner electrode 3 formed on the first ceramic green sheet 1 is formed with margins which include a beginning portion 5, a right side edge portion 6 and an end portion 7 on the one surface of the first ceramic green sheet 1. The second inner electrode 4 formed on the second ceramic green sheet 2 is formed with margins which include a beginning portion 8, a left side edge portion 9 and an end portion 10 on the one surface of the second ceramic green sheet 2. The first ceramic green sheet 1 is superposed on the second ceramic green sheet 2 with their directions shown in these figures being maintained. As shown in FIG. 3, a cylindrical ceramic green core 11 is prepared, and then the superposed, first and second ceramic green sheets 1, 2 described above are rolled about the core 11. For the cylindrical ceramic core 11, the same material as that for the ceramic green sheets 1, 2 is commonly used in order to improve an affinity between both. The left side edge of the first inner electrode 3 is exposed on one end surface of the cylindrical structure obtained by such rolling, and the right side edge of the second inner electrode 4 is exposed on the other end surface thereof. The cylindrical structure is then fired, and outer electrodes are formed on the respective end surfaces, whereby a rolled type of a capacitor is obtained.

The rolled type ceramic capacitor thus obtained is capable of attaining small size for large capacitance and has generally excellent qualities. However, such conventional rolled type ceramic capacitor has the following disadvantages.

FIG. 4 is a partial diagrammatic view in longitudinal section of the ceramic capacitor for explaining the disadvantages of the prior art capacitor. In this prior art, the rolling step is carried out under the condition where at least two ceramic green sheets 1, 2 are superposed upon each other. Therefore, if, in this rolling step, two ceramic green sheets 1, 2 are superposed with each other inaccurately, the inadequacy of positioning with each other arises, as shown in FIG. 4. Such inadequacy of the positioning of the ceramic green sheets 1, 2 may cause the deviation of the inner electrodes 3, 4 from each other. This is undesirable in that the capacitance values are inaccurately controlled. Further, it is clear from the state of FIG. 4 that an inner electrode, such as the inner electrode 4, to be exposed on the end surface of the rolled structure may be concealed by the side edge portion of the ceramic green sheet 1 different from the ceramic green sheet 2 with this inner electrode 4 formed thereon. Accordingly, outer electrodes can not be formed as desired in this state as it is. In order to make the inner electrode 4 exposed on the end surface of the rolled structure, for example, if the structure is cut along a line 12 shown in FIG. 4, then the other inner electrode 3 is also exposed on the same end surface. In this state as it is, the forming of an outer electrode, of course, may cause a short-circuit. In addition, even if the other inner electrode 3 is not brought to be exposed on the end surface on which the inner electrode 4 is exposed, the insulating gap is decreased in distance by the above described cutting and, therefore, only the capacitor of low durability of voltage may be obtained.

Further, also assuming that, in order to increase the efficiency of production, a plurality of inner electrodes are formed while the same are arranged in rows with laying side by side on each ceramic green sheet, the ceramic green sheet is then rolled in multi-layered manner and subsequently cut to size so as to obtain a plurality of ceramic capacitors, the same disadvantages as shown in FIG. 4 may occur. The deviation in positioning the two ceramic green sheets with each other should be vigorously prevented. If such deviation occurs, the cutting operation may be carried out along the cutting line 12 of FIG. 4.

In order to solve such problems shown in FIG. 4, it can be understood that it is desirable to increase the margin of right side edge portion 6 and left side edge portion 9 shown in FIGS. 1 and 2. However, in this case, an alternate disadvantage may be caused. More specifically, by the resulting ceramic capacitor, large capacitance can not be obtained as compared with its large size.

SUMMARY OF THE INVENTION

Accordingly, a principal object of the present invention is to provide a ceramic capacitor which can remove such various disadvantages as described hereinabove and to provide a process of making such ceramic capacitor.

In brief, the present invention is a rolled type ceramic capacitor and a process of making it wherein the rolled type ceramic capacitor is formed by rolling a single ceramic green sheet in a multi-layered manner, spirally in section. The ceramic green sheet is provided with first and second inner electrodes formed on one surface thereof with insulating gaps intervening between the inner electrodes. When the ceramic green sheet is rolled from one end thereof so as to obtain a cylindrical body, at least respective portions of the first and second inner electrodes are opposed to each other with the ceramic green sheet intervening therebetween. The first and second inner electrodes are led out to the different locations, respectively, on the surface of the cylindrical body. First and second outer electrodes are formed on these locations, respectively.

According to the present invention, it is not at all required to consider that a plurality of sheets are superposed on each other exactly as desired in the prior art process, since only a single ceramic green sheet is used. Accordingly, the present process can be carried out with high efficiency. Further, according to the present ceramic capacitor, there is no room for occurence of the lowering of capacitance, the scattering of the capacitance, the short-circuit and so on because of the inadequacy of superposing a plurality of the sheets. Besides, the characteristics which are considered the advantages of a rolled type ceramic capacitor to the effect that the size can be minimized and large capacitance can be obtained are not diminished. Further, in the conventional capacitor shown in FIG. 3, the inductance of the inner electrodes 3, 4 is relatively great to degrade the high frequency characteristics, because the inner electrodes 3, 4 are in a coiled forms where the same are continuously wound in a number of turns, spirally in section. In comparison with it, according to the present ceramic capacitor, the inductance is scarcely formed, the high frequency characteristics are excellent and the capacitor can be used to a high frequency region, because the respective inner electrodes do not extend in the circumferential direction in a number of turns.

In a preferred embodiment of the present invention, the first inner electrode is formed with its one side edge extending to one side edge of the ceramic green sheet and with the other side edge thereof leaving a predetermined margin with respect to the other side edge of the ceramic green sheet. The second inner electrode is directly opposite to the first inner electrode, that is, its one side edge leaves a predetermined margin with respect to said one side edge of the ceramic green sheet and the other side edge thereof extends to said another side edge of the ceramic green sheet. Therefore, the first and second outer electrodes may be formed on the respective end surfaces of the cylindrical body, respectively. Further, there are provided a plurality of first and second inner electrodes, respectively, and these electrodes are alternately arranged in the longitudinal direction of the ceramic green sheet. In a specific preferred embodiment, a pair of inner electrodes oppose to each other throughout almost around with the rolled ceramic green sheet intervening therebetween.

The present invention will be described hereinafter on the basis of embodiments in further detail with reference to the drawings.

BRIEF DESCRIPTION OF THE DRAWINGS

FIGS. 1 and 2 are plane views of ceramic green sheets used in producing a conventional rolled type ceramic capacitor, showing the forming state of inner electrodes;

FIG. 3 is a perspective view showing the state in the course of making the ceramic capacitor by rolling the ceramic green sheets shown in FIGS. 1 and 2;

FIG. 4 is a partial diagrammatic view in longitudinal section of the ceramic capacitor for explaining the disadvantages in prior art;

FIG. 5 is a plane view of a ceramic green sheet used in making an embodiment of the present invention, showing the forming state of inner electrodes;

FIG. 6 diagrammatically shows a process for rolling the ceramic green sheet of FIG. 5;

FIG. 7 is a perspective view showing the rolled state of the ceramic green sheet of FIG. 5;

FIG. 8 is a sectional view taken along the line VIII—VIII in FIG. 7;

FIG. 9 is a sectional view taken along the line IX—IX in FIG. 7;

FIG. 10 is a sectional view showing the structure of FIG. 9 with outer electrode films formed thereon;

FIG. 11 is a sectional view of the structure of FIG. 10 with outer electrode caps put thereon;

FIG. 15 is a sectional view showing the structure of FIG. 11 with external lead terminals and coating resin applied;

FIG. 19 is a plane view of a ceramic green sheet used in making a rolled type ceramic capacitor of still a further embodiment of the present invention, showing the forming state of inner electrodes;

FIG. 20 is a perspective view showing a rolled body obtained by rolling the ceramic green sheet of FIG. 19;

FIG. 21 is a sectional view taken along the line XXI-XXI in FIG. 20;

FIG. 22 is a longitudinal sectional view showing a rolled type ceramic capacitor obtained from the rolled body 130 shown in FIG. 20; and FIG. 23 is a partially sectional view showing another example of rolled type ceramic capacitor obtained by the rolled body 130 shown in FIG. 20.

DESCRIPTION OF THE PREFERRED EMBODIMENTS

Figure 16:
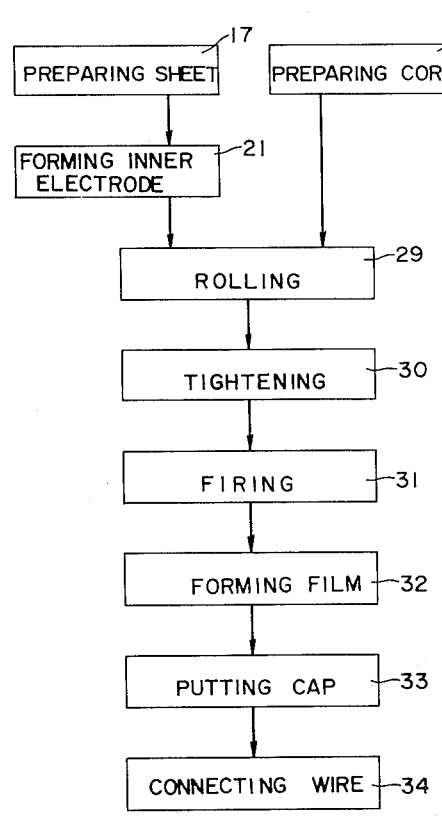
FIG. 16 is a block diagram of the process showing an embodiment of the present process.

FIGS. 5 to 15 show the respective structures obtained at the respective stages of a manufacturing process of a ceramic capacitor in accordance with an embodiment of the present invention, and the manufacturing process of the embodiment of the present invention is generally shown in FIG. 16. The embodiment of the present invention will be described hereinafter in the sequence of steps for manufacturing the same.

First, the step 17 of preparing a green sheet is carried out. As a ceramic dielectric material constituting a ceramic green sheet 18 as shown in FIG. 5, barium titanate is generally used. However titanium dioxide, calcium titanate, strontium titanate, lead titanate, alumina or the like may also be used. In order to prepare a ceramic green sheet of several tens microns in thickness, for example, 100 parts by weight of these dielectric materials are mixed with 10 parts by weight of polyvinyl butyral, 5 parts by weight of the dioctyl phthalate and 50 parts by weight of ethanol by a ball mill for 48 hours, and then the resulting mixed slurry is out-gassed under vacuum. A sheet is formed on a polyethylene film by applying a doctor blade method, and the sheet is dried. Finally, by separating the sheet from the polyethylene film, the ceramic green sheet is first obtained.

On the other hand, in order to obtain a cylindrical core 19 shown in FIG. 7 and so on, a core preparing step 20 is carried out. The core functions as means for holding the form of the ceramic green sheet in its rolling step. There are two cases where the core is taken out prior to a firing step and where the core is subjected to the firing step together as it is. The material of the core is not specifically limited unless the same is fired together with the ceramic green sheet. In case where it is fired together with the ceramic green sheet, ceramic material is preferably used in view of its heat-resistance. As this ceramic material both fired and unfired ceramic core materials may be used. In case where the unfired ceramic core is used as the material of the core, in order to make the firing shrinkage of the ceramic green sheet coincide with that of the core, the same material and binder used in the ceramic green sheet are preferably used. For instance, 100 parts by weight of ceramic material is mixed with 10 parts by weight of polyvinyl butyral, 5 parts by weight of dioctyl phthalate and 20 parts by weight of ethanol. The mixture is kneaded, and then the forming process of the core is carried out by an extruder. If the shape or size of a nozzle used in the extruder is changed, various cores having arbitrary sectional shapes and sizes may be obtained. Although the core 19 shown in FIGS. 7 and 8 has a circular section, it can be changed to a square or a hexagon. In addition, the change of such sectional shape of the core may enable the peripheral shape of the rolled structure to be changed.

Next the step 21 of forming inner electrodes is carried out. In the inner electrode forming step 21, as shown in FIG. 5, a plurality of first inner electrodes 23 and a plurality of second inner electrodes 24 are alternately arranged in the longitudinal direction of the ceramic green sheet 18 on one surface of the ceramic green sheet 18 with insulating gaps 22 intervening therebetween. Each of the first inner electrodes 23 is formed with its left side edge extending to the left side edge of the ceramic green sheet 18 and its right side edge leaving a predetermined margin 25 with respect to the right side edge of the ceramic green sheet 18. Each of the second inner electrodes 24 is formed with its left side edge leaving a predetermined margin 29 with respect to the left side edge of the ceramic green sheet 18 and its right side edge extending to the right side edge of the ceramic green sheet 18. Further, at the beginning and end portions of rolling the ceramic green sheet 18, the beginning and end gaps 27 and 28 of predetermined lengths are provided, respectively, whereby any inner electrodes are not formed there.

As the method of forming the above described inner electrodes 23, 24, a printing paste including a metal for the electrodes may be commonly used. Noble metals or the like having a high melting points, such as platinum or paradium, or alloys of these must be used for the electrode materials as not to cause a reaction with the ceramic green sheet 18 or oxidation even at a high temperature at which the subsequent firing step would be carried out. However, ceramic materials which can be fired at a relatively low temperature have been already developed. Therefore, if such ceramic materials are used, relatively inexpensive metals, such as silver system, nickel system, aluminium system and the like may be advantageously used.

As further process of forming the inner electrodes, sputtering, evaporation or ion-plating process may be applied.

Next the step 29 of rolling is carried out. In the rolling step 29, for example, the method shown in FIG. 6 is applied. More specifically, upper and lower plates 13 and 14 are relatively moved in the direction of arrow 15. The core 19 and the rolled portion of the ceramic green sheet 18 being in contact with the core 19 are rolled with a suitable compression force being applied by the plates 13, 14. Thus the structure shown in FIGS. 7, 8 and 9, that is, the rolled structure of the single ceramic green sheet 18 about the cylindrical core 19 may be obtained. This rolling operation for ceramic green sheet 18 is started from its beginning gap portion 27 and the end gap portion 28 covers at least the last electrode of the rolled body. In this step, the surface with the inner electrodes 23, 24 formed thereon of the ceramic green sheet 18 can be directed either outside or inside. For example, when the ceramic green sheet 18 is rolled with the surface having the inner electrodes 23, 24 directed outside, the end gap portion 28 covers the final inner electrode, therefore, this makes more clear the role of the end gap 28 from an insulating standpoint.

As shown in FIG. 8, in order to attain large capacitance with high efficiency, it is preferable that each pair of first and second inner electrodes 23 and 24 are made opposed to each other and extend almost an entire circumference of a given turn with the ceramic green sheet 18 intervening therebetween. For that purpose, it is required that the sizes of the respective inner electrodes 23, 24 in the longitudinal direction of the ceramic green sheet 18 are gradually lengthened from the inner circumferential side to the outer circumferential side (i.e. as the radius is increased). This is shown in FIG. 5. In FIG. 5, in terms of the sizes in the longitudinal direction of the ceramic green sheet 18, the sizes of the first or second inner electrodes 23, 24 are indicated by L1, L2, ..., Ln in sequence from one positioned at the beginning, and the sizes of the insulating gap 22 are indicated by g. In this case, the size, Ln, is defined by the following expression:

$$Ln = [d + (2n-1) \cdot t] \pi k - g$$

wherein d is the diameter of the core 19, n is the number of turns the ceramic green sheet 18 has taken (at the nth electrode) about the core 19, t is the thickness of the ceramic green sheet 18, and k is the correction factor of the elongation of the ceramic green sheet 18 in the rolling step. In addition, the correction factor, k, should be modified in accordance with the material and quantity of binder used in the forming step of the ceramic green sheet 18, the temperature and rolling conditions in the rolling step, and so on, and is empirically determined.

It should be noted that there are no other requirements except that only the single ceramic green sheet 18 is rolled in the above described rolling step 29. Accordingly, there is no need to superpose a plurality of ceramic green sheets exactly and, therefore, the problem associated with positioning a plurality of ceramic green sheets can be eliminated. As a result, ceramic capacitors having stable, unchanged capacitance values and having high qualities can be obtained.

Next a tightening step 30 is preferably carried out. For the effective rolling of the ceramic green sheet 18, highly plastic compositions with binders are required. However, even considering the above, the adhesion between the ceramic green sheet 18 and the core 19 or between the layered sections of the ceramic green sheet 18 is not sufficient to prevent delamination which may occur after the firing operation. Accordingly, that tightening step 30 is required and this is so carried out that a uniform pressure is exerted on the surface of the rolled structure of the ceramic green sheet 18 from its surroundings.

Next a firing step 31 is carried out. In this firing step 31, for example, an electric furnace may be used. Although the firing temperature and firing time are changed according to the ceramic materials, the average conditions are of a temperature of 1,000° C. to 1,400° C. and of 1 to 2 hours. In addition, in the firing step 31, it is preferable that a heating rate near the decomposition temperature of the binder is controlled more carefully in order to prevent the ceramic from delaminating. More specifically, the temperatures near the decomposition of the binder are raised slowly. In addition, as described above, prior to this firing step 31, the core 19 may be removed.

Next the step of forming outer electrodes is carried out. The outer electrodes can be formed in various manners in accordance with required products to be obtained. More specifically, the process of forming the outer electrodes comprises the step 32 of forming outer electrode films, the step 33 of putting caps, and the step 34 of connecting lead wires, as described hereinafter. However, of these steps, the process of forming the electrodes may be terminated by the step 32 of forming the outer electrode films or the step 33 of mounting the caps and succeeding step or steps may be omitted.

In the step 32 of forming the outer electrode films, as shown in FIG. 10, first and second outer electrode films 35 and 36 is formed on the opposite end surfaces, respectively, of the fired structure shown in FIG. 9. In order to provide the outer electrode films 35, 36, generally, the opposite ends of the structure of FIG. 9 are coated with a silver paste and the structure is baked at a temperature of about 800° C., for example. When the outer electrode films 35, 36 are thus formed, the first outer electrode film 35 is brought into contact with the first inner electrode 23 and the second outer electrode film 36 is brought into contact with the second inner electrode 24. Thus, the first and second inner electrodes 23, 24 are lead out to different locations on the surface of the structure shown in FIG. 10 by the first and second outer electrode films 35, 36. The structure shown in FIG. 10 can be used as a chip-type ceramic capacitor having a pair of outer electrodes at the opposite ends thereof by itself.

Next the step 33 of putting caps is preferably carried out. In the cap putting step 33, a first outer electrode cap 37 is put on one end portion of the structure shown in FIG. 10 with the same being electrically connected to the first outer electrode film 35. The second outer electrode cap 38 is also put on the other end of the structure with the same being electrically connected to the outer electrode film 36. In order to strengthen the electrical connections of the first and second outer electrode caps 37, 38 to each of the outer electrode films 35, 36 and thus the mechanical retensions of the first and second outer electrode caps 37, 38 to the ceramic unit, for example, the outer electrode caps 37, 38 and the outer electrode films 35, 36 are preferably soldered to each other, respectively. In this soldering, the process of reflowing solder which previously plates at least the interior surfaces of the outer electrode caps 37, 38, the process of reflowing solder cream which is applied on portions to be soldered, and the process combined with these processes can be adopted. Further, a conductive paint may be used whereby the conductive paint upon hardening may join the outer electrode caps 37, 38 to the outer electrode films 35, 36. The structure shown in FIG. 11 may be also used as a chip-type ceramic capacitor by itself.

Figure 12:
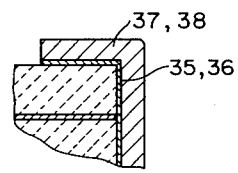
FIGS. 12 to 14 are fragmentary sectional views showing various examples of the overlapping states of outer electrode films and outer electrode caps.
Figure 13:
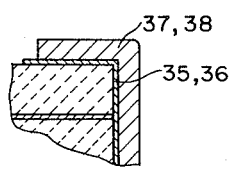
Figure 14:
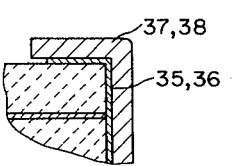

In addition, as shown in FIGS. 12 to 14, respectively, the overlapping state of outer electrode films 35, 36 with the outer electrode caps 37, 38 may be arbitrarily selected. FIG. 12 shows the case where the edges of the outer electrode films 35, 36 correspond with the edges of the outer electrode caps 37, 38. FIG. 13 shows the state where the edges of the outer electrode films 35, 36 extend over the outer electrode caps 37, 38. FIG. 14 shows the case where the edges of the outer electrode films 35, 36 are positioned inside the edges of the outer electrode caps 37, 38.

Next the step 34 of connecting lead wires is preferably carried out. In the lead wire connecting step 34, a first lead wire 39 is connected to the first outer electrode cap 37, and a second lead wire 40 is connected to the second outer electrode cap 38. For connecting the lead wires 39, 40 to the outer electrode caps 37, 38, for example, a welding operation may be adopted. In addition, the direction of leading out the lead wires 39, 40 can be changed as shown by two phantom lines in FIG. 15. More specifically, the leading out direction of the lead wires 39, 40 may be selected from either of an axial direction or a radial direction. The outer electrode caps 37, 38 with preattached lead wires 39, 40 may be mounted in the cap putting step 33 instead of this lead wire connecting step 34 being carried out after the cap mounting step 33. Thus, a ceramic capacitor with lead wires can be obtained.

Furthermore, as shown in FIG. 15, the surfaces of the structure shown in FIG. 15 may be covered by the exterior resin 41 of excellent electric insulation leaving exposed the surfaces of the outer electrode cap 37, 38 and lead wires 39, 40. In addition, such exterior resin 41 can be applied to both of the structures shown in FIGS. 10 and 11.

According to the chip-type ceramic capacitor shown in FIG. 10, when barium titanate material or dielectric constant of 10,000 is used as a ceramic material and the capacitor is formed into a cylindrical shape of 1.8 mm in diameter and 3.2 mm in length, large capacitance of 0.1 $\mu$F can be attained. A ceramic capacitor so constructed that the outer electrode caps 37, 38 are mounted on the above described chip-type ceramic capacitor and the lead wires 39, 40 are connected to them in the axial direction can be inserted into a 6.35 mm wide space on a printed-circuit board and can contribute to minimizing the size of an electronic circuit.

Figure 17:
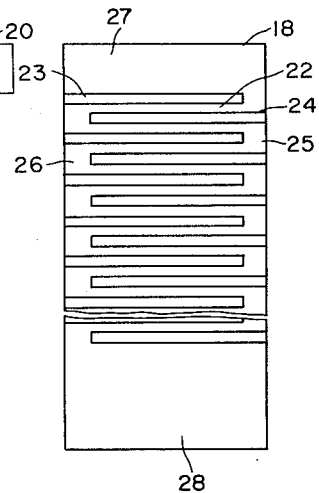
FIG. 17 is a plane view of a ceramic green sheet used in making another embodiment of the present invention, showing the forming state of inner electrodes.
Figure 18:
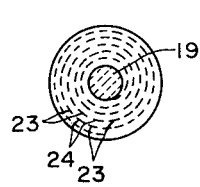
FIG. 18 is a sectional view corresponding to FIG. 8, showing the rolling state of the ceramic green sheet of FIG. 17.

FIG. 17 is a plane view of a ceramic green sheet used in making another embodiment of the present invention, showing the forming state of inner electrodes. FIG. 18 is a sectional view corresponding to FIG. 8, showing the rolling state of the ceramic green sheet 18 shown in FIG. 17.

As compared with the above described embodiment, first and second inner electrodes 23, 24 of shorter sizes in the longitudinal direction of the ceramic green sheet 18 are formed on one surface of the ceramic green sheet 18. This embodiment is basically different from the above described embodiment in that a plurality of first and second inner electrodes 23, 24 have substantially the same size. Each of inner electrodes 23, 24 may be formed by means of printing, for example. The other construction and a production processes are similar to those of the above described embodiment and the portions corresponding to those described in the above described embodiment are given like reference numerals and repeated explanations will be omitted.

According to this embodiment, as shown in FIG. 18, a plurality of capacitor elements achieved by a pair of electrodes, i.e. one first inner electrode 23 and one second inner electrode 24 are so constructed as to be combined in all directions. According to the ceramic capacitor of this embodiment, the capacitance value thereof is in general determined by the length of the ceramic green sheet 18. Therefore, the ceramic green sheet 18 may be empirically cut to suitable sizes dictated by the capacitance desired.

In addition, in the two basic embodiments described above, the outer electrodes are lead out on the opposite end surfaces of the ceramic unit. However, if the forming state of the inner electrodes is modified, one of the outer electrodes can be lead out on the exterior peripheral surface of the ceramic unit, for example. And besides, if the ceramic unit is so formed as to be a hollow cylindrical body, an outer electrode can be lead out from the interior peripheral side of the ceramic unit.

FIGS. 19 to 23 show still a further embodiment of the present invention. Referring to FIG. 19, first and second inner electrodes 121 and 128 are formed on a ceramic green sheet 118. The first inner electrode 121 has a pair of comb-like conductive pattern in general. The second inner electrode, in general, has a conductive pattern interdigitating with the first inner electrode 121 and extending like the backbone. In further detail, the first inner electrode 121 comprises a plurality of left side electrodes 122a formed along the left hand side of the ceramic green sheet 18 in FIG. 19 and distributed in the longitudinal direction of the ceramic green sheet 118, a plurality of right side electrodes 122b formed along the right hand side of the ceramic green sheet 118 and distributed in the longitudinal direction of the ceramic green sheet 118, a left side edge electrode 123a connecting the left side electrodes 122a together and extending along the left hand side edge of the ceramic green sheet 118, a right side edge electrode 123b connecting the right side electrodes 122b together and extending along the right hand side edge of the ceramic green sheet 118, and a pass-through conductive path 124 connecting the left side edge electrode 123a to the right side edge electrode 123b near or at the beginning 119 of the ceramic green sheet 118. The second inner electrode 128 comprises a plurality of central electrodes 125 so arranged as to alternate with each left side electrode 122a or right side electrode 122b of the first inner electrode 121 across each insulating gap g in terms of the longitudinal direction of the ceramic green sheet 118, conductive strips 126 connecting the central electrodes 125 together at the central portion in width of the ceramic green sheet 118, and a lead-out electrode 127 extending from the central electrode 125 nearest from the end 120 of the ceramic green sheet 118 to the end 120. In addition, also in FIG. 19, the sizes in the longitudinal direction of the ceramic green sheet 118 of the left and right side electrodes 122a, 122b and the central electrodes 125 are indicated by L1, L2, ..., Ln with successive from one positioned at the side of the beginning 119 of the ceramic green sheet, and the size of each insulating gap in the longitudinal direction of the ceramic green sheet 118 is indicated by g. In this situation, the sizes Ln are defined by the same expression as the above described expression.

The ceramic green sheet 118 shown in FIG. 19 is prepared, then the core for rolling, not shown, is prepared, and the ceramic green sheet 118 is rolled from the beginning 119 about the core. During this step, the rolling operation of the ceramic green sheet 118 is carried out while the surface with the first and second inner electrodes 121 and 128 forming thereon faces is outside. When the ceramic green sheet 118 is thus rolled, a rolled body 130 shown in FIG. 20 is obtained. The above described lead-out electrode 127 of the second inner electrode 128 is exposed on a portion of the exterior peripheral surface of the rolled body 130. Since the lead-out electrode 127 is to be electrically connected to an external circuit, at least one portion of the electrode 127 is preferably composed of a metal having sufficient bonding power to ceramic and which is solderable, such as baked silver. The left side edge electrode 123a (FIG. 19) of the first inner electrode 121 is exposed on one end surface 130a of the rolled body 130, and the left side edge electrode 123b (FIG. 19) of the first inner electrode 121 is exposed on the other end surface 130b.

As shown in FIG. 21, when the section of the rolled body 130 is observed, substantially the same section as that shown in FIG. 8 referred above appears. In this section, for example, the left side electrodes 122a and the central electrodes 125 are opposed to each other and the gaps g of predetermined sizes are formed between the edges of each electrode.

Referring to FIG. 22, the opposite end surfaces 130a, 130b of the rolled body 130 (FIG. 20) are provided with first and second outer electrode films 131, 132, respectively. The forming operation of the outer electrode films 131, 132 is generally carried out through the steps of applying silver paste onto the opposite end surfaces 130a, 130b of the rolled body 130 and baking the same at a temperature of 800° C. for 30 minutes, for example. When the outer electrode films 131, 132 are thus formed, the first outer electrode film 130 is brought into contact with the left side edge electrode 123a of the first inner electrode 121 and the second outer electrode film 132 is brought into contact with right side edge electrode 123b of the first inner electrode 121. In this state as it is, the resulting ceramic capacitor may be used as a chip-type ceramic capacitor.

First and second electrode caps 133, 134 are preferably put on the respective ends of the rolled body 130, respectively, with the first and second electrode caps 133, 134 being electrically connected to the first and second outer electrode films 131, 132. Further, lead wires 135 and 136 may be connected to these first and second electrode caps 133, 134, respectively. The modifications of the shapes these lead wires 135, 136 are shown by phantom lines in FIG. 22. Further, as shown by dotted lines in FIG. 22, a flanged terminal may be fixed and connected to the lead-out electrode 127. The flanged terminal serves as means for positioning this ceramic capacitor to a printed-circuit board or a chassis, when the ceramic capacitor having such structure is arranged perpendicularly to such printed-circuit board or chassis with the capacitor passing through an aperture formed therein. In this case, the electrical connecting between the lead-out electrode 127 and the conductive portion of the print circuit board or the chassis is achieved by soldering the flanged terminal to the conductive portion.

Referring to FIG. 23, there is shown a capacitor of feed-through type. The rolled body 130 is provided with a pass-through hole extending along the axis thereof. The pass-through hole can be easily formed by putting the above described core out. A feed-through conductor 138 is inserted through the pass-through hole and electrically connected to each outer electrode films 131, 132, respectively, by soldering, for example. Further, an outer terminal 137 is electrically connected to the lead-out electrode 127. According to such construction, a feed-through ceramic capacitor which attains capacitance between the outer terminal 137 and the feed-through conductor 138 may be obtained.

In addition, in the respective embodiments described hereinabove, a single ceramic green sheet for a single capacitor device is prepared and a plurality of electrodes is formed thereon as desired. However, a plurality of capacitor devices as well can be obtained from a single ceramic green sheet. For this purpose, electrodes are arranged side by side with the intention of obtaining a plurality of capactior devices in the widthwise direction of a ceramic green sheet and then, for example, after the stage of rolling the ceramic green sheet or after the stage of firing, the rolled body is cut to predetermined sizes in the direction perpendicular to the axis thereof, whereby a plurality of capacitor devices can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A process of making a ceramic capacitor, said process comprising the steps of:

forming a plurality of first and second inner electrodes on one surface of an elongated ceramic green sheet having first and second generally parallel longitudinal side edges, said first and second electrodes being alternately arranged in the longitudinal direction of said ceramic green sheet, an insulating gap of size g, being located between each adjacent electrode, said ceramic green sheet having a thickness t, each of said first inner electrodes being formed with one side edge thereof extending to said first side edge of said ceramic green sheet and another side edge thereof extending towards, but being spaced from, said second side edge of said ceramic green sheet, each of said second inner electrodes being formed with one side edge thereof extending to said second side edge of said ceramic green ceramic sheet and another side edge thereof extending toward, but being spaced from, said first side edge of said ceramic green sheet;

rolling said ceramic green sheet into a multilayered cylindrical body of inner diameter d, said rolling step causing an elongation of said ceramic green sheet, said rolling step being formed in such a manner that each first inner electrode overlaps a respective second inner electrode, said ceramic green sheet being interposed therebetween, the length Ln of each successive electrode being equal to:

$$Ln = [d + (2n-1)t]\pi k - g$$

wherein n is the number of turns of the rolled ceramic green sheet, and k is a correction factor which compensates for the elongation of said sheet during the rolling step;

forming first and second outer electrodes at respective locations on the surface of said cylindrical body, said plurality of first and second inner electrodes being electrically connected to said first and second outer electrodes, respectively.

2. A process in accordance with claim 1, wherein said first and second outer electrodes are formed on respective end surfaces of said cylindrical body.

3. A process in accordance with claim 2, wherein said first and second inner electrodes are alternately arranged in the longitudinal direction of said ceramic green sheet.

4. A process in accordance with any of claims 1, 2 or 3, wherein said step of rolling the ceramic green sheet comprises the steps of preparing a cylindrical core, and rolling said ceramic green sheet about said cylindrical core.

5. A process in accordance with claim 4, wherein said step of rolling the ceramic green sheet comprises the step of tightening the ceramic green sheet after rolling said ceramic green sheet.

6. A process in accordance with any of claims 2 or 3, wherein said step of forming said first and second outer electrodes comprises the step of forming outer electrode films on respective end surfaces of said cylindrical body.

* * * * *